(12) United States Patent
Calhoun et al.

(10) Patent No.: US 8,959,747 B2
(45) Date of Patent: Feb. 24, 2015

(54) STRUCTURAL COUPLER

(75) Inventors: Jeremy Leonard Calhoun, Tara (CA);
Richard William Henbid, Port Elgin (CA); Dennis Patrick Dalton, Owen Sound (CA); William Howard Tran, Durham (CA)

(73) Assignee: Calhoun Super Structures, Ltd., Tara, Ontario (CA)

( * ) Notice: Subject to any disclaimer, the term of this patent is extended or adjusted under 35 U.S.C. 154(b) by 258 days.

(21) Appl. No.: 13/537,742

(22) Filed: Jun. 29, 2012

(65) Prior Publication Data

US 2013/0167358 A1    Jul. 4, 2013

(30) Foreign Application Priority Data

Jun. 30, 2011    (CA) ..................................... 2744759

(51) Int. Cl.
| | | |
|---|---|---|
| B23P 11/00 | (2006.01) | |
| F16B 7/00 | (2006.01) | |
| E04B 1/24 | (2006.01) | |
| E04C 3/40 | (2006.01) | |
| F16B 7/18 | (2006.01) | |

(52) U.S. Cl.
CPC ... *F16B 7/00* (2013.01); *E04B 1/24* (2013.01); *E04C 3/40* (2013.01); *E04B 2001/2415* (2013.01); *E04B 2001/2418* (2013.01); *E04B 2001/2451* (2013.01); *E04B 2001/2457* (2013.01); *E04B 2001/2472* (2013.01); *E04B 2001/2487* (2013.01); *F16B 7/182* (2013.01)
USPC ...................................... 29/525.01; 303/376

(58) Field of Classification Search
USPC ......... 29/897, 897.3, 897.31, 897.33, 897.35, 29/525.01, 525.02; 403/376, 266
See application file for complete search history.

(56) References Cited

U.S. PATENT DOCUMENTS

| | | | |
|---|---|---|---|
| 2,214,177 | A | 9/1940 | Raybould |
| 2001/0037620 | A1 | 11/2001 | Choi |

FOREIGN PATENT DOCUMENTS

JP     2013133901    *  7/2013

OTHER PUBLICATIONS

Office Action from Counterpart Canadian Application No. 2,744,759, dated Oct. 23, 2013, 2 pp.

* cited by examiner

*Primary Examiner* — John C Hong
(74) *Attorney, Agent, or Firm* — Shumaker & Sieffert, P.A.

(57) ABSTRACT

In the present disclosure, a structural coupler is disclosed for coupling together structural members, such as trusses. The structural coupler is dimensioned such that it can be installed at an end and within an inner channel of the structural member. The structural member includes a gusset member, a face member and a reinforcing member. The face member is connected to the gusset member and the reinforcing member is connected to both the gusset member and the face member. To couple structural members together, the face member of the structural member installed at an end of a first structural member is mated with the face member of the structural member installed at an end of a second structural member. The structural couplers are then joined together using a coupling mechanism.

17 Claims, 13 Drawing Sheets

STRUCTURAL COUPLER

TECHNICAL FIELD

The present disclosure relates to a structural coupler and, in particular, a structural coupler for coupling structural members together.

BACKGROUND

Tensioned membrane structures are erected using a network of structural members such as the building structure 100 shown in FIG. 1. The structural member may be a truss or other structural tubes or frames that are designed to withstand the forces typically associated with such building structures. In FIG. 1, the building structure 100 is made up of at least three arch-like frameworks 102, 104, 106, that define an interior space 110 (See FIG. 2). By covering the network of arch-like frameworks with appropriate material, a building structure 100 is created. FIG. 2 illustrates one of those arch-like frameworks shown in FIG. 1.

In order to create the framework, such as the arch-like framework shown in FIG. 2, the structural members, such as trusses, must be joined together. For example, the arch-like framework shown in FIG. 2 may be constructed by joining together a combination of trusses of varying configurations. Each open end of the truss is joined together with the next truss to create the arch-like framework shown in FIG. 2.

Currently, there are several known methods of joining trusses and other structural members together. However, known methods lack structural capacity, create eccentricities, are bulky and/or are non-uniform. Accordingly, a structural coupler that addresses some of these deficiencies remains highly desirable

SUMMARY

In accordance with the present disclosure there is provided a structural coupler for coupling structural members together, the structural coupler being dimensioned to fit within an inner channel of the structural member and attached to an end of the structural member, the structural coupler comprising: a gusset member; a face member connected to the gusset member, the face member for coupling with a face member of another structural coupler using a coupling mechanism when coupling structural members together; and a reinforcing member connected to the gusset member and the face member.

In accordance with the present disclosure there is further provided a structural tubular member defining an inner channel and having an end for joining together with another structural tubular member, the structural tubular member comprising: a structural coupler attached at the end and within the inner channel of the structural tubular member, the structural coupler comprising: a gusset member; a face member connected to the gusset member, the face member for coupling with a face member of another structural coupler using a coupling mechanism when coupling structural tubular members together; and a reinforcing member connected to the gusset member and the face member.

In accordance with the present disclosure there is further provided a method of joining structural members together, the method comprising: aligning a first structural member having a structural coupler attached to an end of the first structural member with a second structural member having a structural coupler attached to an end of the second structural member; mating a face member of the structural coupler of the first structural member with a face member of the structural coupler of the second structural member; and coupling the structural coupler of the first structural member with the structural coupler of the second structural member using a coupling mechanism.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

Embodiments are described below, by way of example only, with reference to FIGS. 1-8D.

The present disclosure generally relates to a structural coupler for joining structural members together. The structural members, such as trusses, are used to erect building structures like the structure 100 shown in FIG. 1. With the underlying framework in place, the framework can be covered with weather-resistant fabric to create a temporary or permanent building. The structural coupler disclosed in the present disclosure may be applicable to buildings that require structural members to be joined together, including tensioned membrane structures and structures constructed using pre-engineered rigid frames.

Figure 1:
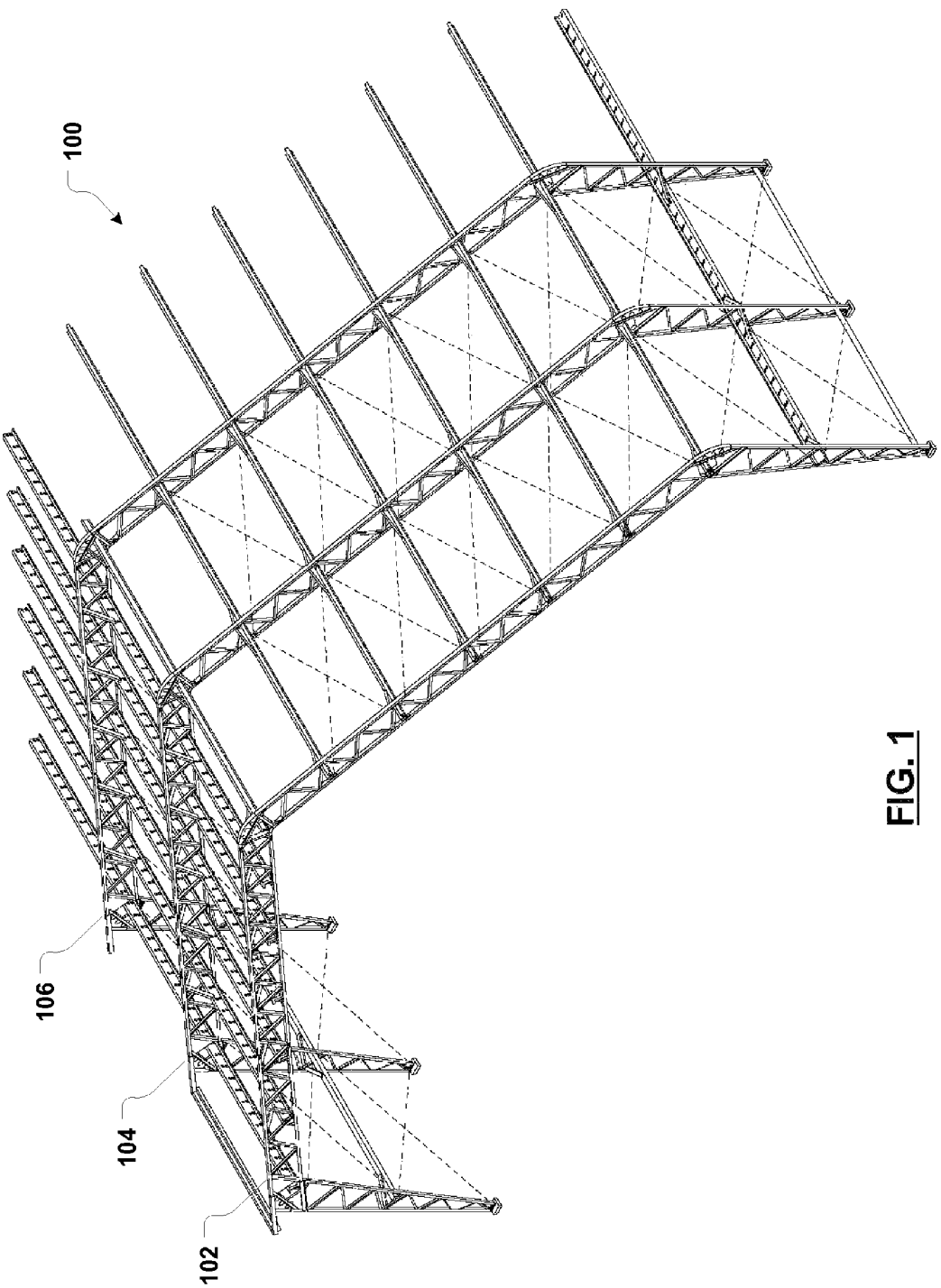
FIG. 1 illustrates a perspective view of a building structure comprised of arch-like framework.
Figure 2:
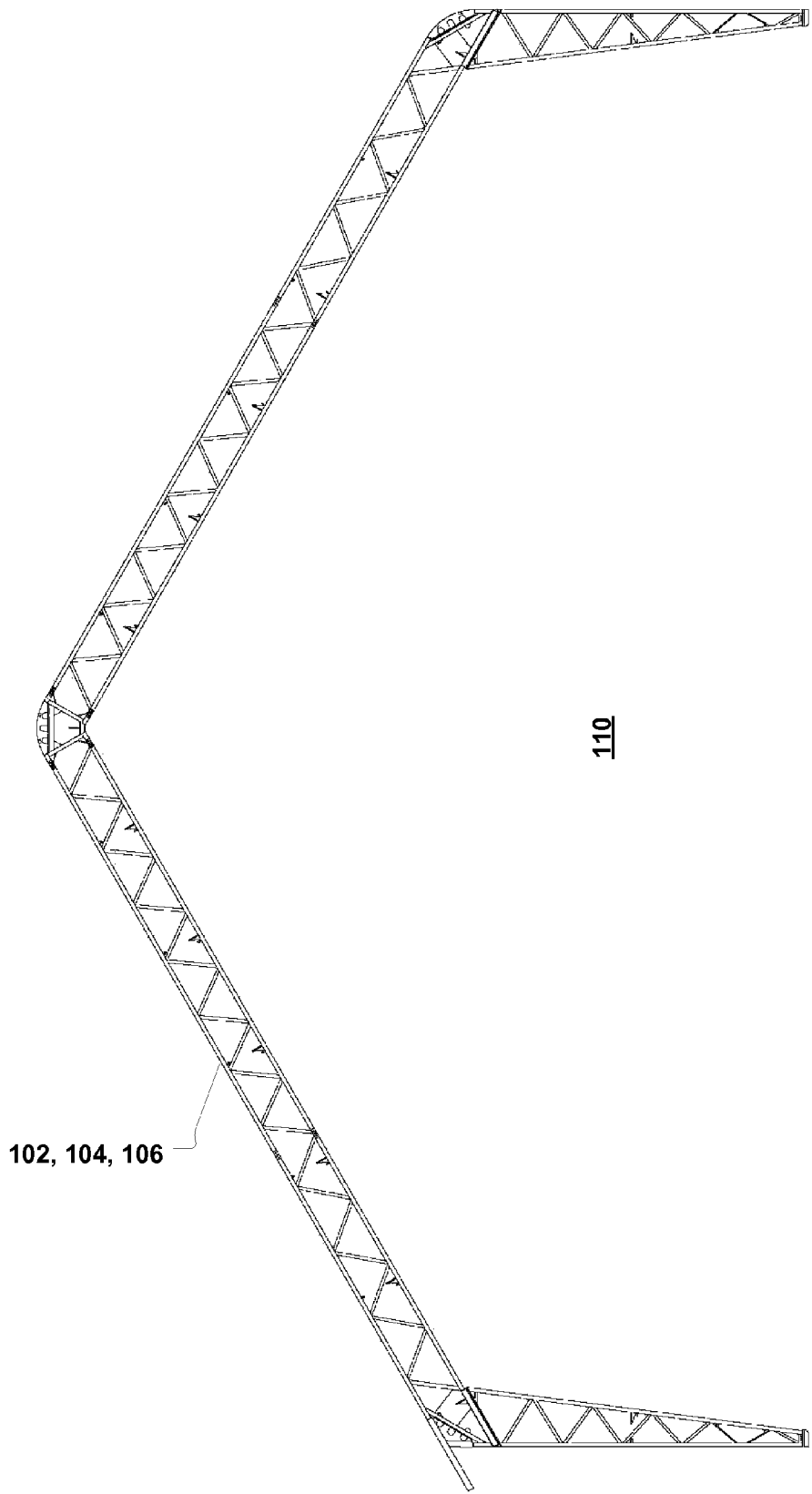
FIG. 2 illustrates an elevation view of an arch-like framework.

In FIG. 1, the building structure 100 is shown to comprise at least three arch-like frameworks 102, 104, 106 that define an interior space 110 (See FIG. 2). Each of the three arch-like frameworks 102, 104, 106, as shown in FIG. 2, are created by using different configuration of trusses or structural members such as those shown in FIG. 4. While the building in FIG. 1 is shown to be erected using a network of arch-like frameworks 102, 104, 106, it will be understood that similar buildings may be erected using peak, monoslope, interior column or any other framework designs. It will be also understood that there may be more or less than three arch-like frameworks.

There are several known ways to join trusses together. For example, a simple overlapping joint may be used. However, such overlapping joints are limited by the lack of structural capacity. Other higher capacity joints, such as non-concentric and non-overlapping joints, are known; however, they are often bulky and non-uniform, and create eccentricities that reduce the structural capacity at the joint.

There is also known a U-shaped coupler for joining trusses together. While the U-shaped coupler is higher in structural capacity and reduces eccentricities at the joint, it was cumbersome to ship because of the requisite U-shaped clip. Moreover, because of its attachment to the open end, it hindered drainage of chemical, such as galvanizing chemicals.

In this specification and the appended claims, the singular forms "a," "an," and "the" include plural references unless the context clearly dictates otherwise. Unless defined otherwise, all technical and scientific terms used herein have the same meaning as commonly understood to one of ordinary skill in the art to which this disclosure belongs.

It will be further understood that the terms "comprises" or "comprising", or both when used in this specification, specify the presence of stated features, integers, steps, operations, elements, and/or components, but do not preclude the presence or addition of one or more other features, integers, steps, operations, elements, components, and/or groups thereof.

Figure 3:
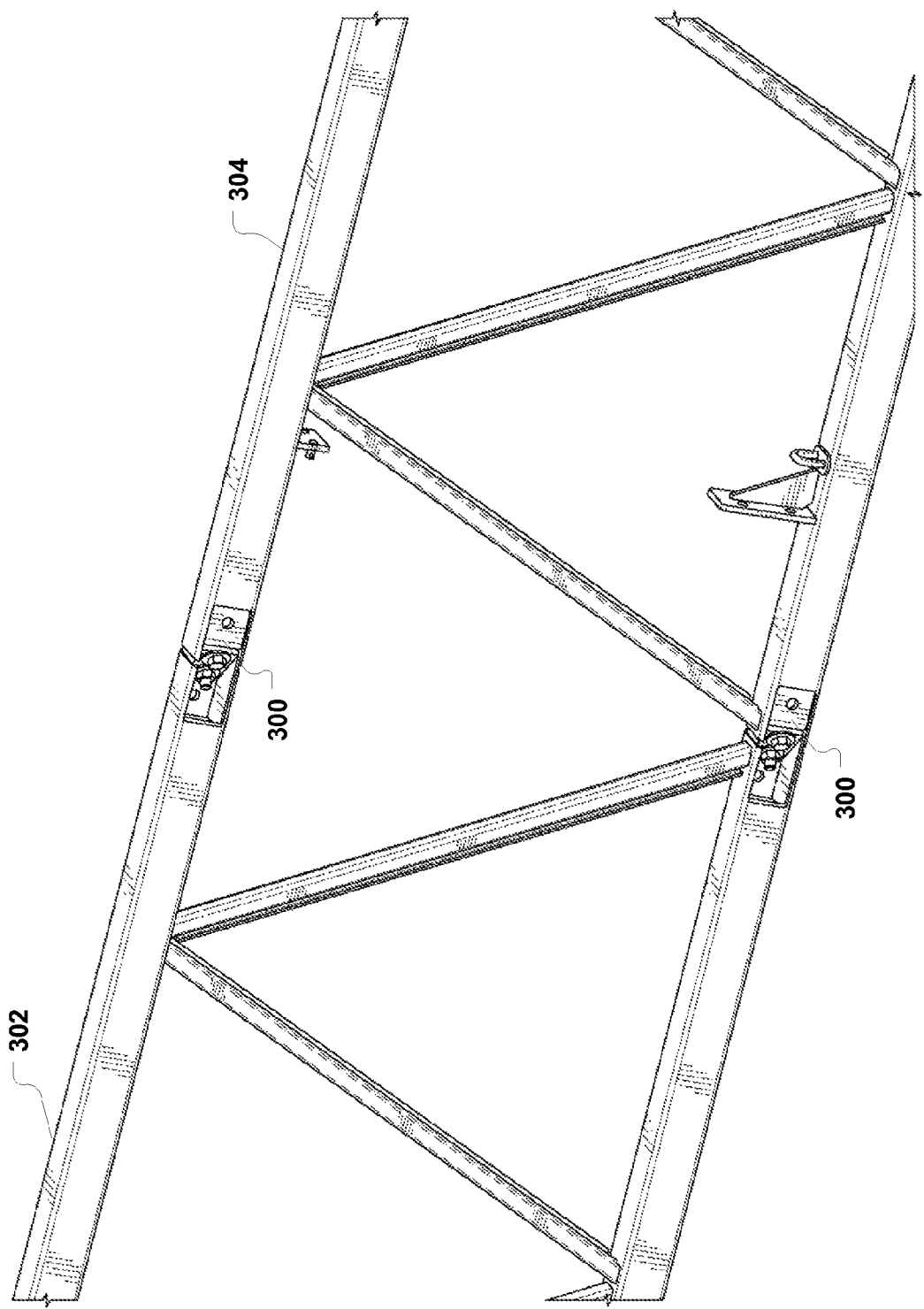
FIG. 3 illustrates a perspective view of structural members joined together using an embodiment of the structural couplers disclosed in this disclosure.

Referring to FIG. 3, there is shown structural members 302 and 304 joined together by structural couplers 300, which have been attached to the open ends of the structural members 302 and 304. As shown, the structural coupler 300 is designed to fit within the inner channel (see 800 in FIGS. 8A and 8B) of the structural members 302, 304. As a result, the structural coupler 300 is concealed within the structural members 302 and 304, thereby making the structural members 302 and 304 more compact for shipping. Moreover, the structural coupler 300 reduces eccentricities at the joint because the structural coupler 300 is not offset from the axis of the joint. Thus, the structural capacity at the joint is improved.

Figure 4:
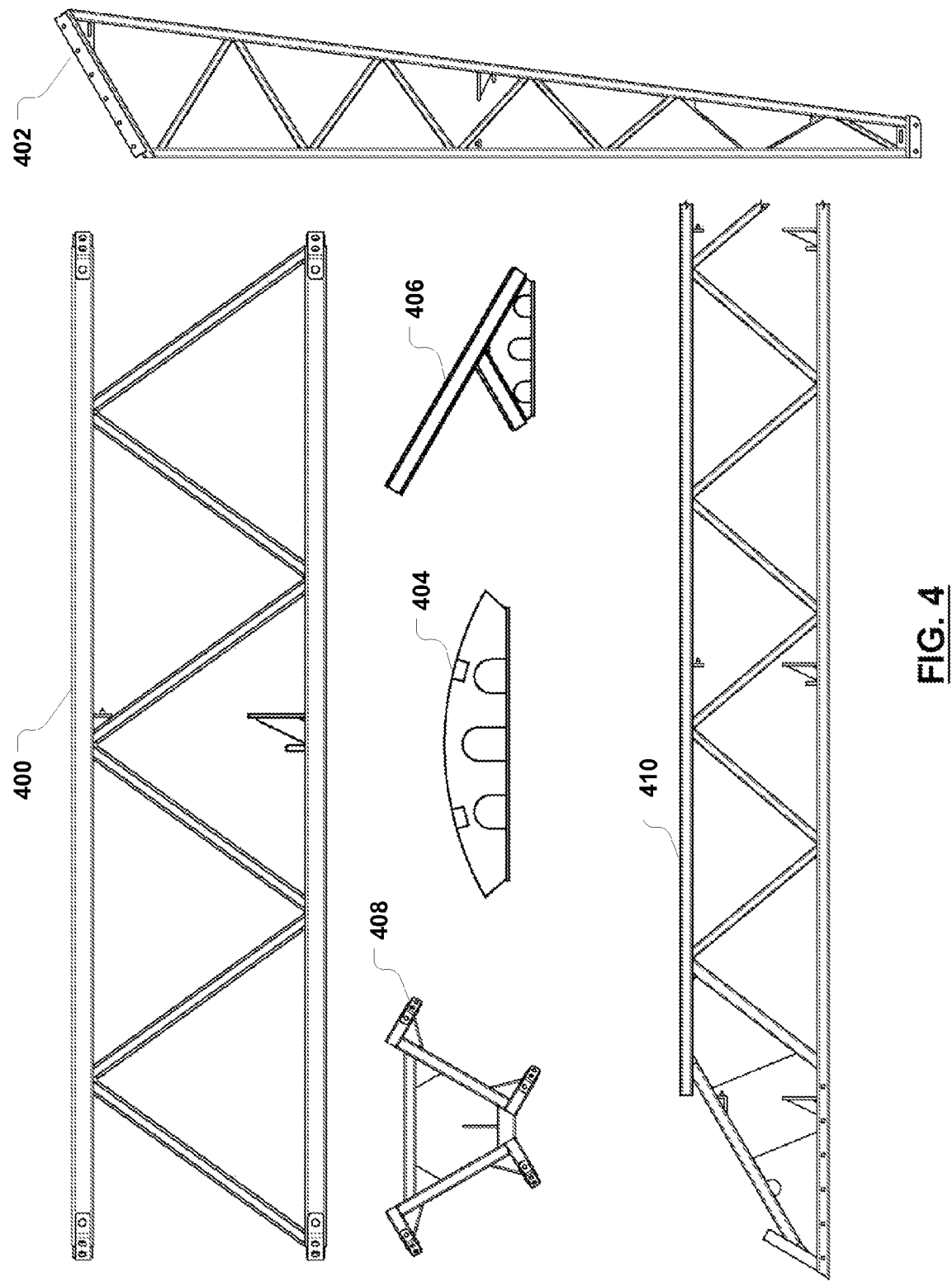
FIG. 4 illustrates different types of structural elements.

While FIG. 3 depicts two structural members, in the form of planar truss, joined together by using the structural coupler 300, it will be understood that the structural coupler 300 may be used to join other truss configurations and structural elements such as those shown in FIG. 4. For example, in addition to a typical planar truss 400, the structural coupler 300 may be used with a leg element 402, a ridge 404, an eave 406, peak truss 408 and a shoulder truss 410. Using these structural elements, structural frameworks, such as the arch-like framework 102, 104, 106 may be constructed.

Figure 5:
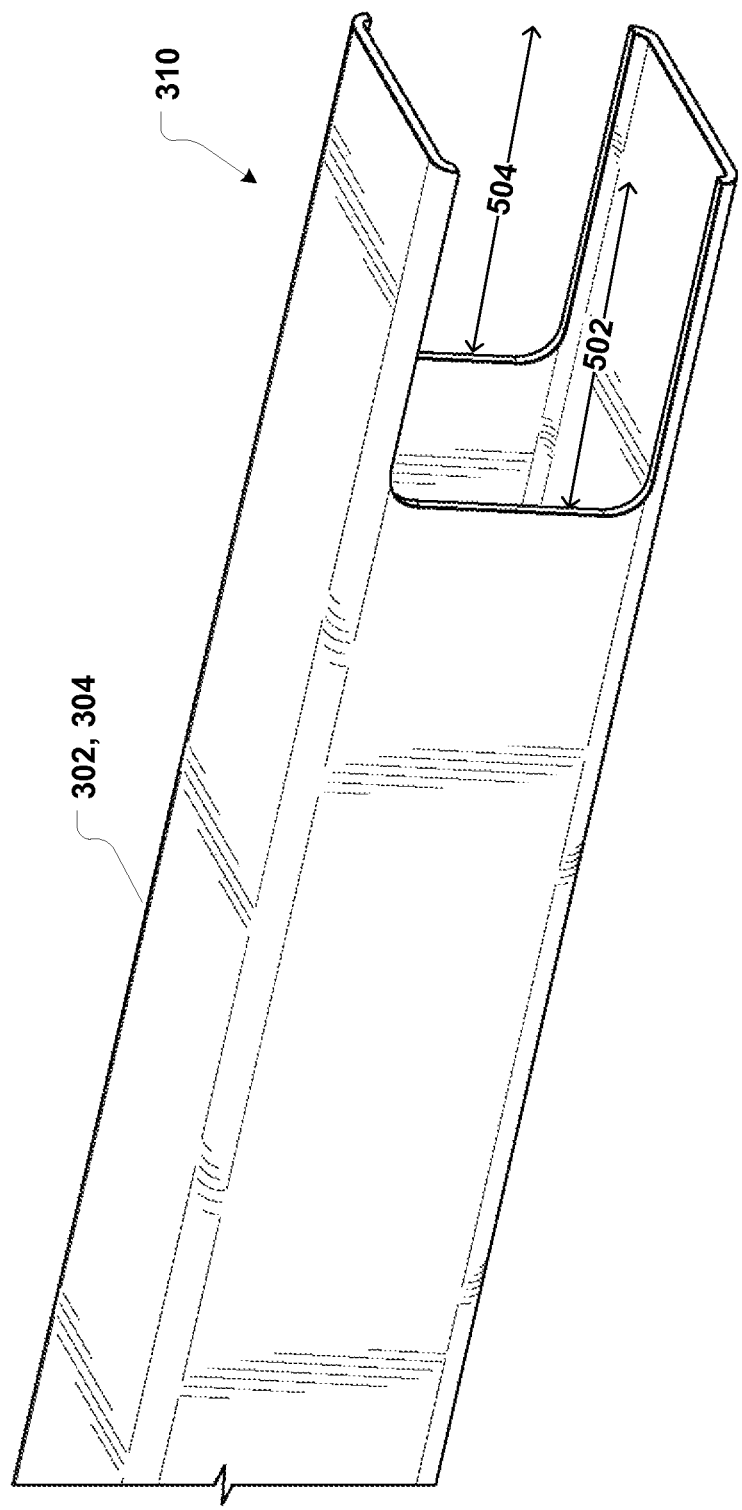
FIG. 5 illustrates an end of a structural member with opposing cut-out portions.

Now referring to FIG. 5, a close-up view of an end 310 of the structural member 302, 304 is illustrated. As shown, the end 310 has opposing cut-out portions 502 and 504 designed to give access to the coupling mechanism (e.g. 806 of FIG. 8B) of the structural coupler 300. The cut-out portions 502 and 504 also facilitate better draining of the structural member. For example, the structural member may be galvanized after the structural coupler is attached to the end of the structural member. As it will be explained below, each end of the structural member that serves as a joint may have opposing cut-out portions 502, 504 and at each such end, a structural coupler 300 may be attached to facilitate coupling with another structural member. The details of the coupling mechanism and the cut-out portions will be further explained below.

Figure 6A:
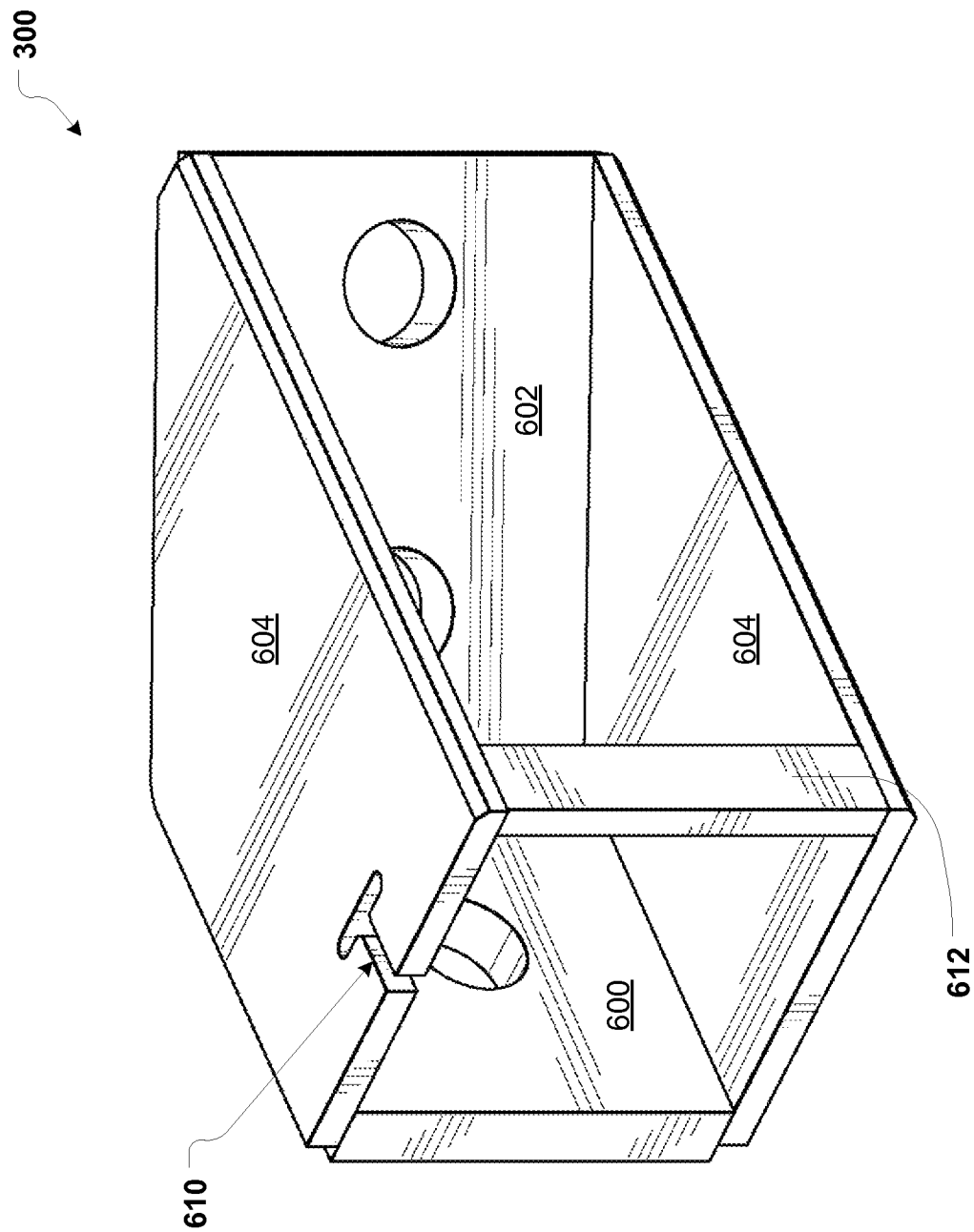
FIGS. 6A and 6B illustrate an embodiment of the structural coupler from two different angles.
Figure 6B:
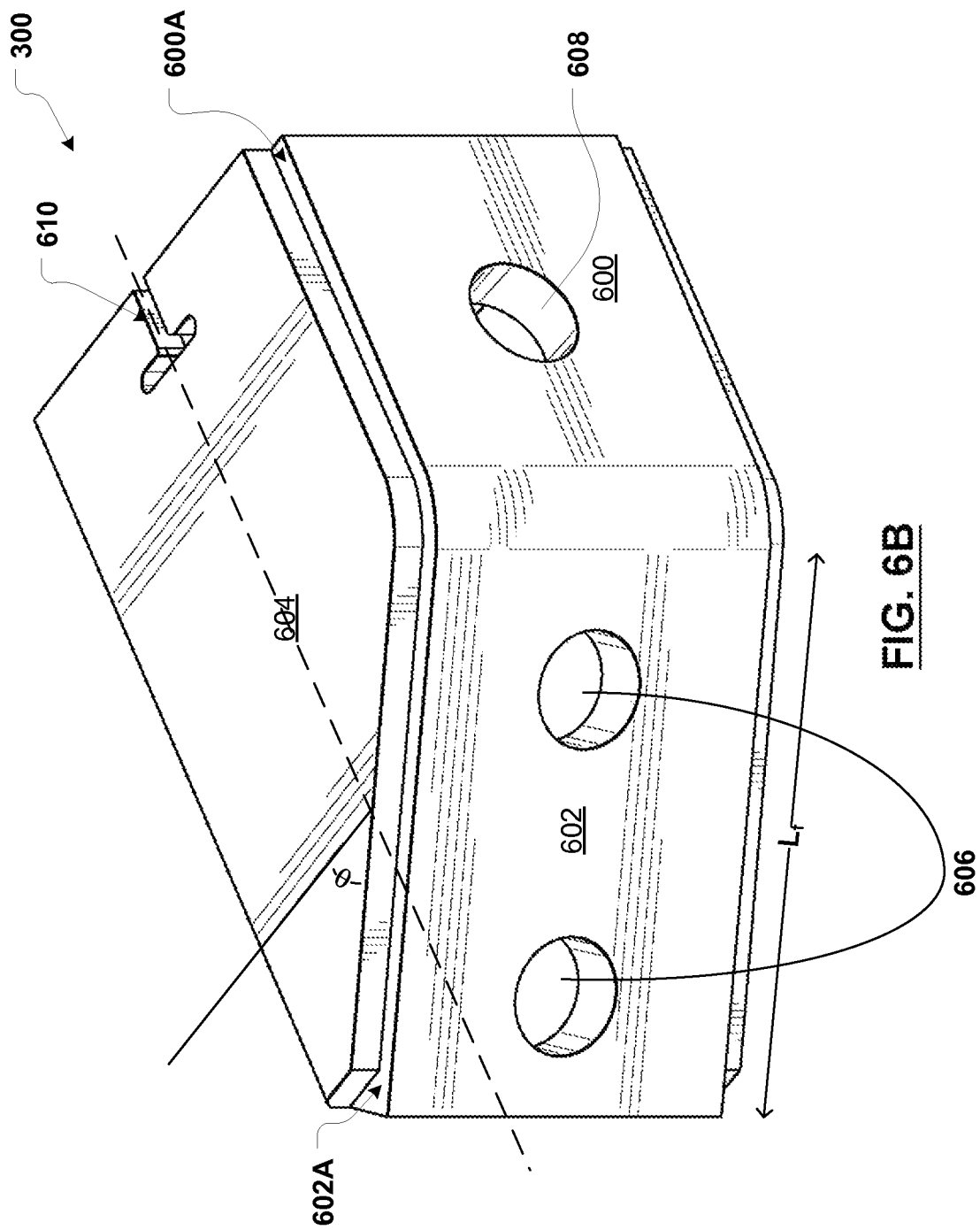

Now turning to FIGS. 6A and 6B, the structural coupler 300 is shown from two different angles. The structural coupler 300 comprises a gusset member 600, a face member 602 connected to the gusset member 600, and a reinforcing member 604 connected to both the gusset member 600 and the face member 602. The face member 602 is designed to mate with a face member of another structural coupler and coupled using a coupling mechanism, such as bolts (see 806 in FIG. 7). In the embodiment shown in FIGS. 6A and 6B, the face member 602 of the structural coupler 300 is shown to be angled forward at 45°. In this context, "forward" means toward the distal end of the structural member (e.g. 302, 304), away from the centre point of the structural member. Since the face member is designed to mate "face to face" with a face member of another structural coupler, the face member of the another structural coupler can also be at 45°, thereby providing a uniform part design. However, it will be understood that, uniform part design can also be achieved with different angles. According to other embodiments of the structural coupler, the face member 602 may be angled between 0° and 60°, when measured from the axis perpendicular to the centre axis of the structural member. Put another way, the face member 602 may be angled between 90° and 150° from the gusset member 600 (see θ in FIG. 6B).

Furthermore, the face member 602 may have bolt holes 606 to accommodate for bolts, where bolts are used for the coupling mechanism. Additionally, the gusset member 600 may include a through-hole 608 for securing the structural members during shipping. For example, a plurality of structural members may be placed on a truck bed, which may be secured together by a metal rod slid through the through-holes 608 of each structural members with a cap on the ends of the metal rod. Alternatively, a durable rope may be passed through each through-hole 608 and can be used to tie the structural members together prior to shipping. This allows the structural members to be held together during shipping. Other securing mechanisms may be used with or without the use of the through-hole 608. While the gusset member 600 has been described as having one through-hole 608, it will be understood that the gusset member 600 may not have any through-hole 608 or more than one through-hole 608.

Figure 7A:
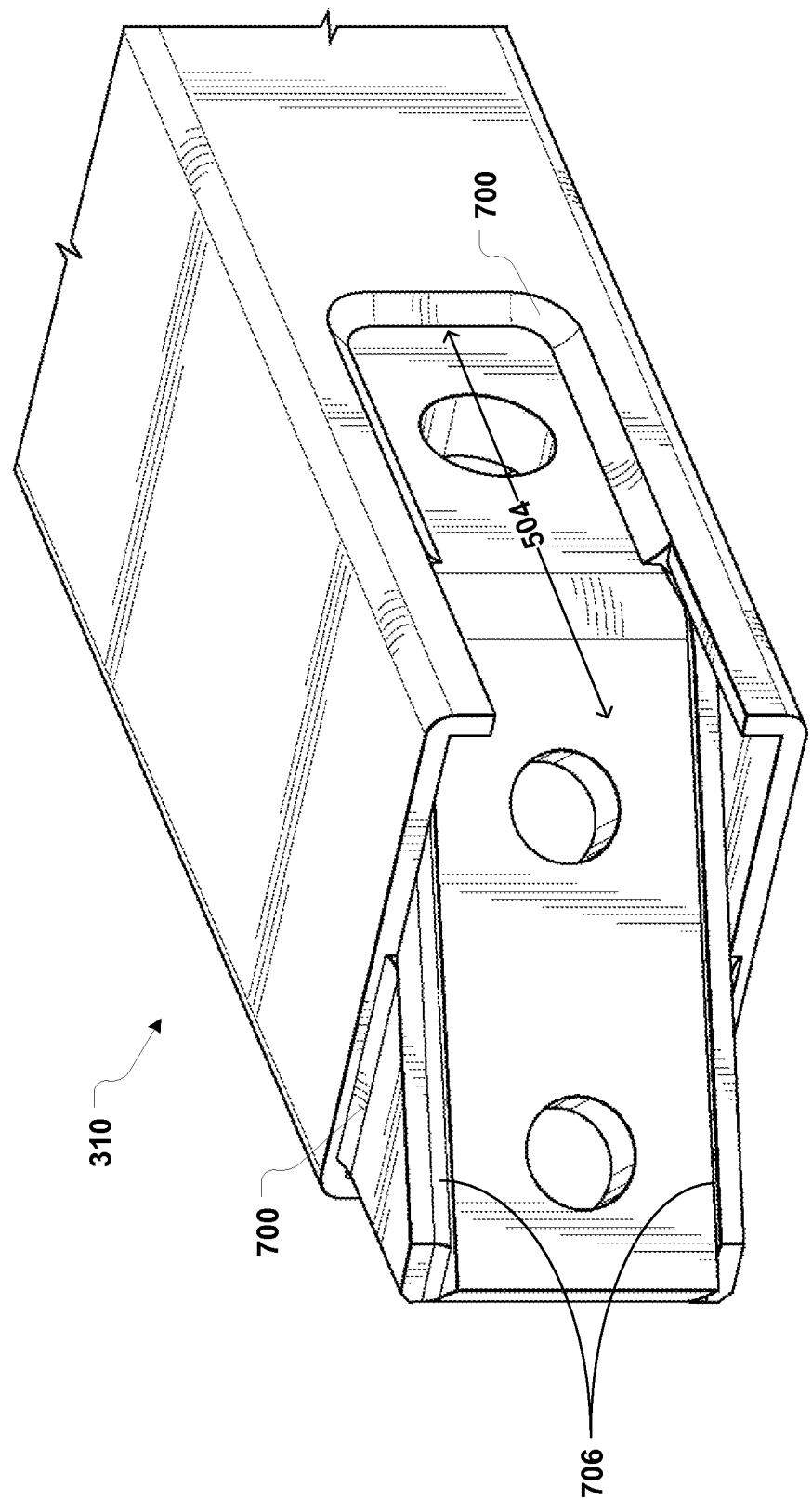
FIGS. 7A and 7B illustrate an embodiment of the structural coupler installed on the end of the structural member.
Figure 7B:
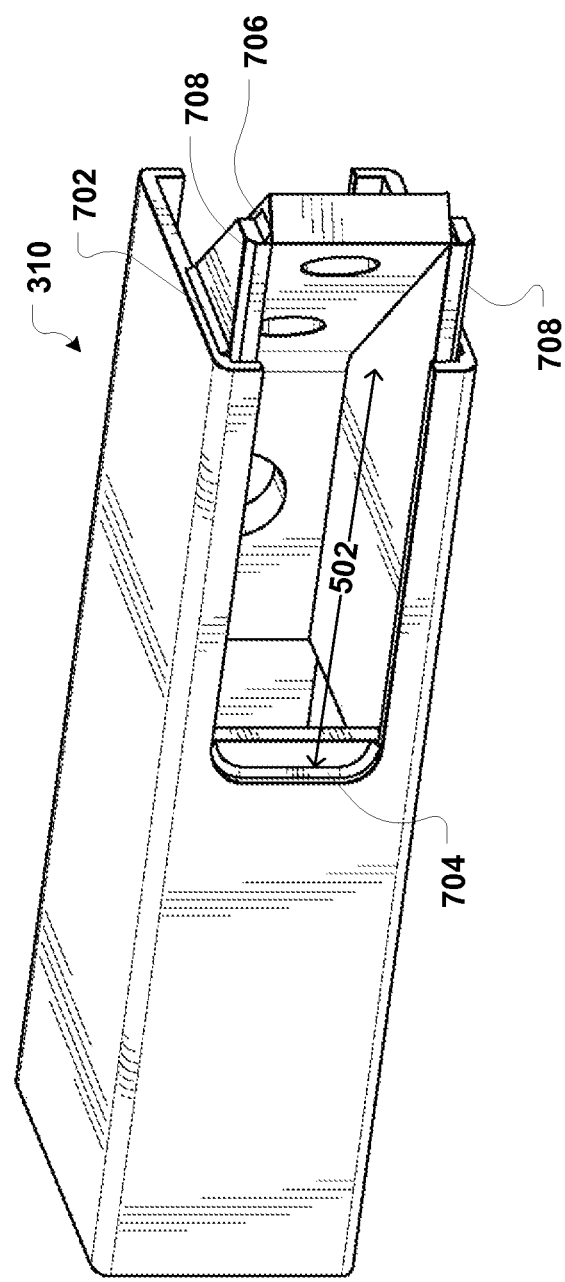

The structural coupler 300 further has a reinforcing member 604 attached to both the gusset member 600 and face member 602. For example, the reinforcing member 604 may be welded against the side edges 600A, 602A of the gusset member 600 and face member 602, respectively. While FIGS. 6A and 6B do not show any weld seam, FIGS. 7A and 7B show weld seams 706. Additionally, to facilitate better fitment of the structural coupler 300 into the inner channel (e.g. 800 in FIGS. 8A and 8B) of the structural member, the reinforcing member 604 may have bevelled edges 708. In another embodiment, the gusset member 600 and face member 602 may also have bevelled edges (not shown).

The reinforcing member 604 is designed to reinforce the gusset member 600 and face member 602 against tensile and compressive forces exerted on the structural coupler 300. In other words, when compression force is exerted on the structural coupler 300, the reinforcing member 604 prevents the face member 602 from collapsing against the gusset member 600. When tension force is exerted on the structural coupler 300, the reinforcing member 604 also prevents the face member 602 from flattening forward. In one embodiment, the structural coupler 300 has one reinforcing member 604 attached to the gusset member 600 and the face member 602. In another embodiment, the structural coupler 300 has two reinforcing members 604 as shown in FIGS. 6A and 6B. Where there are two reinforcing members, an orientation marker 610 may be placed on one of the reinforcing members to ensure that the structural coupler is installed properly on the end of the structural member. In the embodiment shown in FIGS. 6A and 6B, the orientation marker 610 is a cut-out on the reinforcing member 604. Moreover, the two reinforcing members may be joined by a bridge 612 to further help the reinforcing members resist against the forces exerted on the face member 602.

Now turning to FIGS. 7A and 7B, a close-up view of the end 310, with the structural coupler 300 attached, is shown from two different angles. As it can be seen, the end 310 of the structural member (e.g. 302) may have opposing cut-out portions (e.g. 502, 504). The cut-out portions facilitate draining of the structural member and also provide access to the coupling mechanism. The dimensions of the cut-out portion may vary depending on various factors, including the type and dimensions of the coupling mechanism, the configuration and dimensions of the structural coupler, and how the structural coupler is attached to the end of the structural member. For example, if the structural coupler is welded to the structural member, a larger cut-out portion may be provided to increase the weld capacity. By making the cut-out portion larger, for example, weld seams 700 and 704 may be increased.

Now referring to FIGS. 8A-8D, an exemplary embodiment of joining two structural members will be described using the structural coupler described in this disclosure.

A structural member, such as structural member 300, is provided. The structural member is generally tubular (i.e. rectangular, circular or ellipsoidal in cross-section) in shape and defines an inner channel 800. The structural member has at least one open end (e.g. 310 in FIG. 5) for joining with another structural member to construct the basic skeleton framework of a building structure. For example, the building structure may comprise of one or more arch-like framework as shown in FIG. 2. Because the joint (also often referred to as the node) experiences tensile and compressive forces, the coupler used to join the structural members together must have sufficient structural capacity.

At the open end of the structural member, there are opposing cut-out portions where the structural coupler according to an embodiment of the present disclosure will be attached. As described above, the opposing cut-out portions facilitate draining of fluids (e.g. chemicals used in galvanizing the structural member) and allow access to the coupling mechanism of the structural coupler.

To install the structural coupler, the structural coupler (e.g. 300 in FIGS. 6A and 6B) is inserted into the inner channel 800 of the structural member and attached to the end of the structural member. For example, the structural coupler 300 may be welded to the end as shown with weld seams 700, 702 and 704 in FIGS. 7A and 7B. The structural coupler may be inserted into the inner channel 800 at various depths. In one embodiment, the structural coupler is inserted into the inner channel 800 until half of the length or also hereinafter referred to as half-depth (e.g. half of $L_f$ in FIG. 6B) of the face member 602 is inserted. In this embodiment, the gap 804 between the structural members being coupled would be nil or minimal. In another embodiment, the structural coupler is inserted into the inner channel 800 until 3/16" (inch) past the half-depth. In this embodiment, a gap 804 of 1/8" is created at the joint, which may be used as an alternative or additional coupling mechanism. For example, the 1/8" gap may be used to weld the structural couplers together. It will be understood that in other embodiments, the structural coupler may be installed at different depths.

Thus, the structural coupler may be attached to the end of the structural member at production or the structural coupler may be attached to an already produced structural member. Additionally, the structural member with or without the structural coupler attached may be treated (e.g. galvanized) to increase longevity of the components.

Figure 8A:
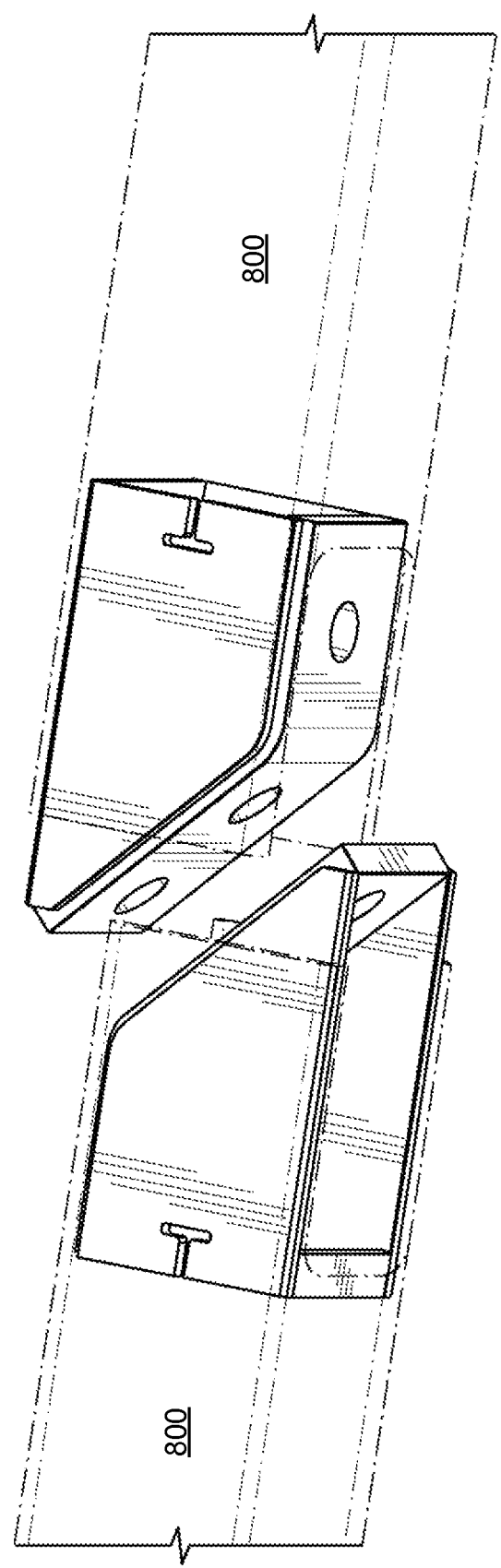
FIG. 8A illustrates structural couplers installed at the ends of the structural members and aligned to be joined together.
Figure 8B:
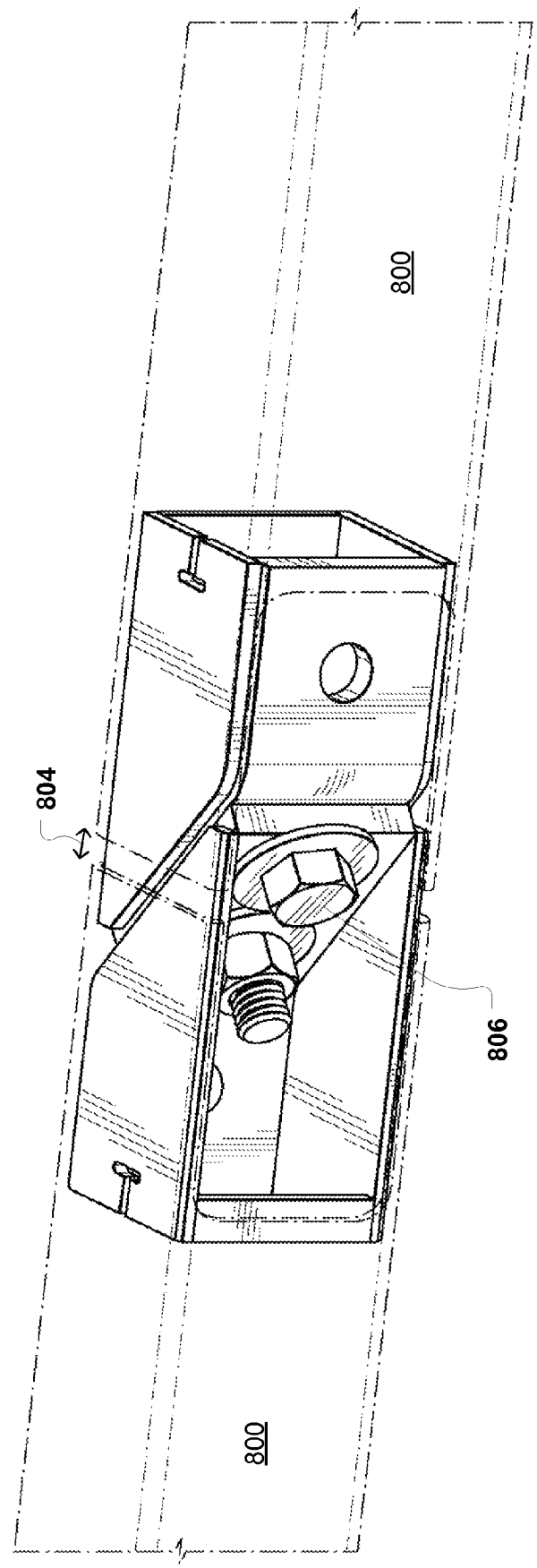
FIG. 8B illustrates the structural members joined together and coupled using a coupling mechanism.

To join such structural members together, the structural members are aligned and brought closer together as shown in FIG. 8A. When the structural members are aligned and the face members are mated "face to face", as shown in FIG. 8B, a coupling mechanism is used to secure the structural members together. In FIG. 8B, the coupling mechanism is illustrated in the form of nuts and bolts 806. While the couplers in FIG. 8B are shown to be joined by two nuts and bolts 806, it will be understood that, depending on the dimensions of the couplers and the structural members, there may be more or less than two nuts and bolts 806. For example, the structural coupler may require nuts and bolts in a two-by-two configuration, totalling four nuts and bolts. Moreover, the coupling mechanism may be a more permanent mechanism such as rivets.

Because the structural members have cut-out portions, the nuts and bolts 806 are accessible for ease of installation and uninstallation. However, it will be understood that the structural members may not have cut-out portions and employ a different coupling mechanism, such as welding. In this embodiment, the structural couplers may be installed at a depth greater than half-depth to allow for sufficient gap 804 to increase the weld capacity between the structural couplers.

Figure 8C:
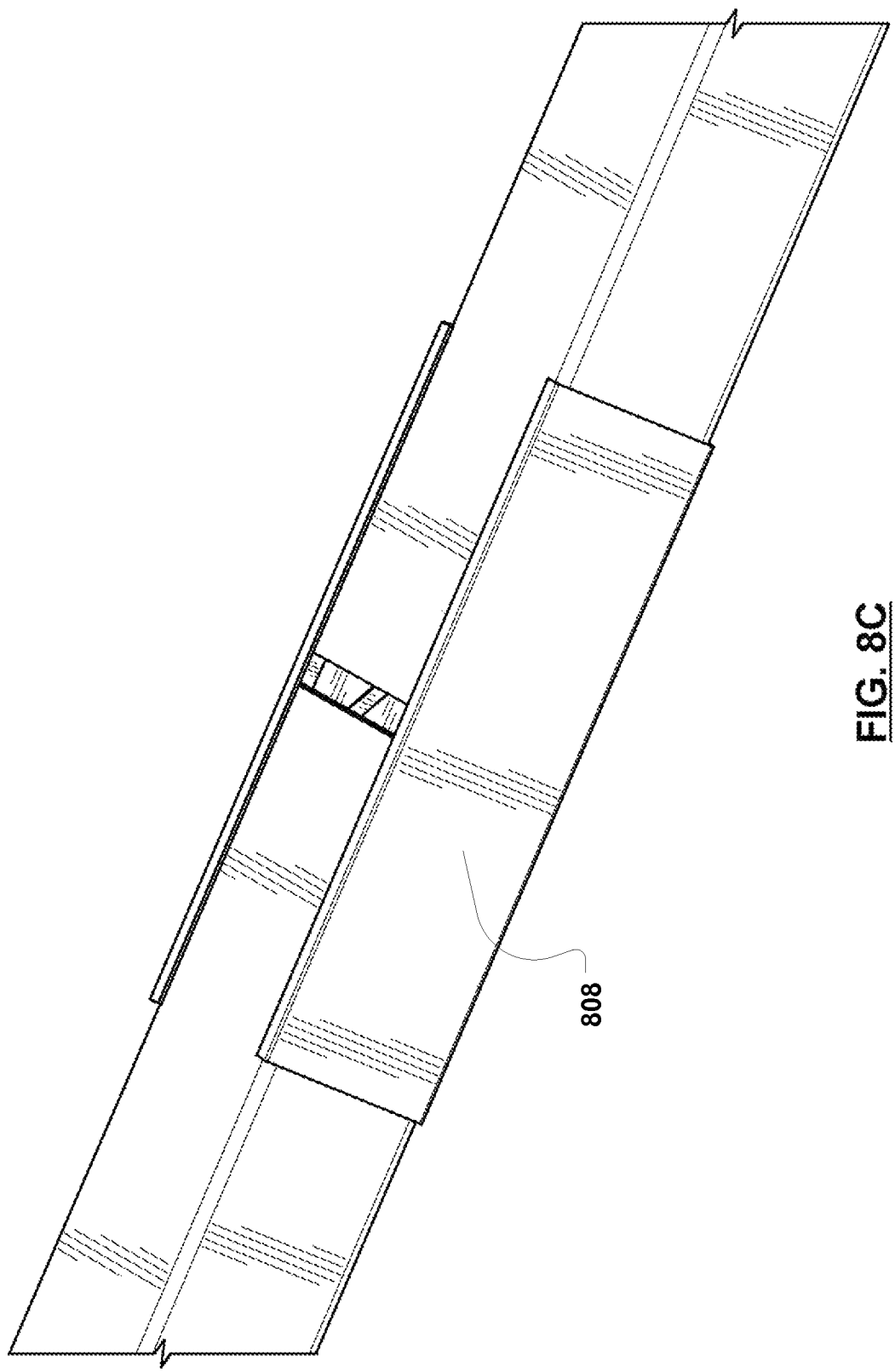
FIGS. 8C and 8D illustrate a beauty cap installed at the end of the joined structural members.
Figure 8D:
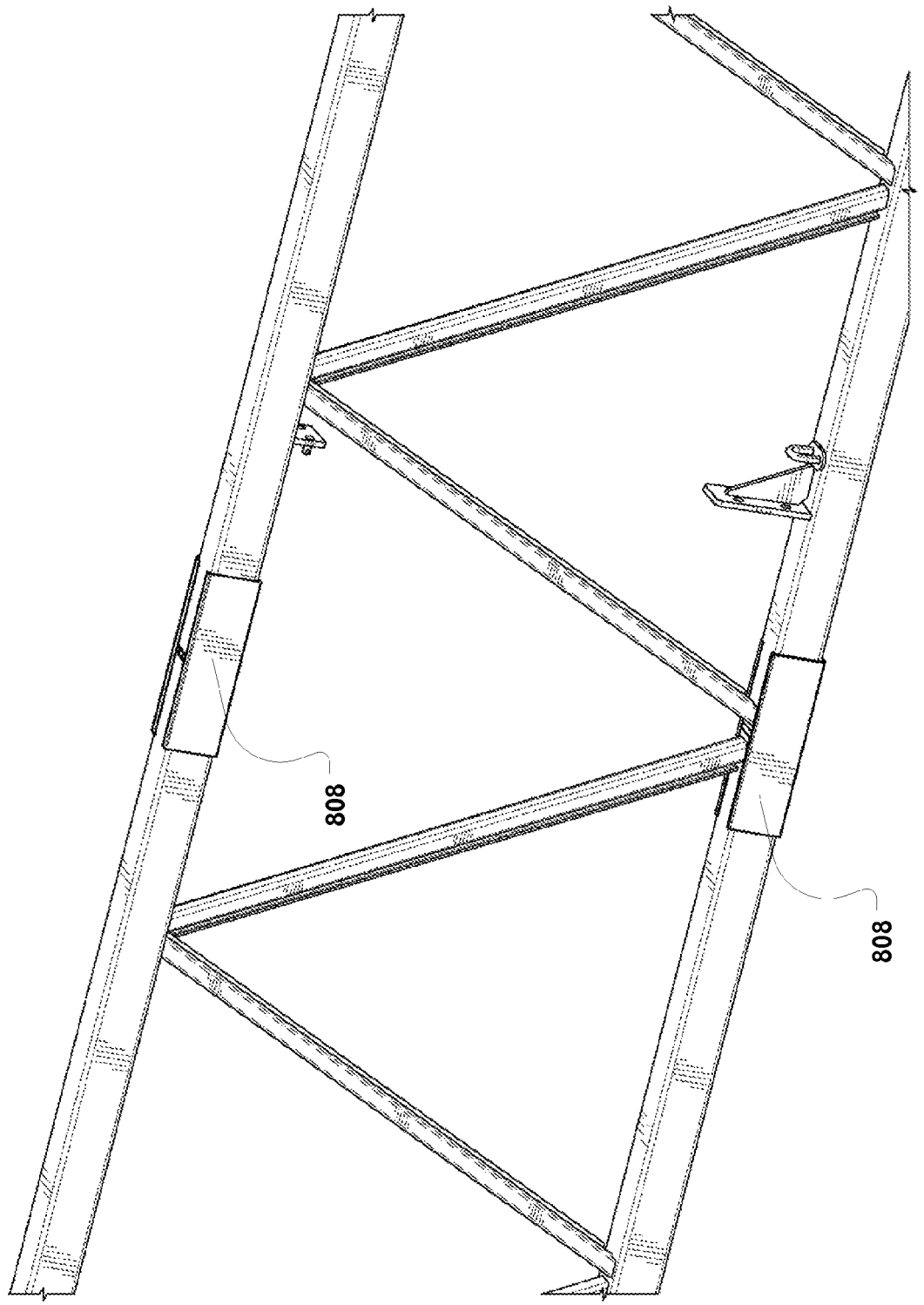

Additionally, a beauty cap 808, as shown in FIGS. 8C and 8D, may be installed over the cut-out portions. This may have numerous advantages including keeping salt, birds and insects out of the structural members.

Thus, the structural members are joined together by the structural coupler, which is designed to couple the structural members together while minimizing eccentricities at the joint. Moreover, the structural coupler is installed within the inner channel of the structural member, thereby making the structural member more compact for shipping.

While the present technology has been described in terms of specific implementations and configurations, further modifications, variations, modifications and refinements may be made without departing from the inventive concepts presented herein. The scope of the exclusive right sought by the Applicant(s) is therefore intended to be limited solely by the appended claims.

What is claimed is:

1. A structural coupler for coupling structural members together, the structural coupler being dimensioned to fit within an inner channel of the structural member and attached to an end of the structural member, the structural coupler comprising:
   a gusset member;
   a face member connected to the gusset member, the face member for coupling with a face member of another structural coupler using a coupling mechanism when coupling structural members together; and
   a reinforcing member connected to the gusset member and the face member.

2. The structural coupler according to claim 1, wherein the face member is angled forward at 45 degrees.

3. The structural coupler according to claim 1, comprising two reinforcing members connected to the gusset member and the face member.

4. The structural coupler according to claim 3, wherein the two reinforcing members are parallel to one another and joined by a bridge.

5. The structural coupler according to claim 3, wherein one of the reinforcing members has an orientation marker.

6. The structural coupler according to claim 1, wherein the coupling mechanism is a nut and bolt, and the face member having a bolt hole.

7. The structural coupler according to claim 1, wherein the gusset member has a through-hole.

8. The structural coupler according to claim 1, wherein at least one of the gusset member, face member and reinforcing member has bevelled edges.

9. A structural tubular member defining an inner channel and having an end for joining together with another structural tubular member, the structural tubular member comprising:

a structural coupler attached at the end and within the inner channel of the structural tubular member, the structural coupler comprising:
  a gusset member;
  a face member connected to the gusset member, the face member for coupling with a face member of another structural coupler using a coupling mechanism when coupling structural tubular members together; and
  a reinforcing member connected to the gusset member and the face member.

10. The structural tubular member according to claim 9, wherein the end comprises opposing cut-out portions.

11. The structural tubular member according to claim 10, wherein the opposing cut-out portions are covered by a beauty cap.

12. The structural tubular member according to claim 9, wherein the structural coupler is attached at the end and within the inner channel of the structural tubular member such that a gap is formed between the joined structural tubular members.

13. The structural tubular member according to claim 9, wherein the structural coupler is attached to the end by welding.

14. A method of joining structural members together, the method comprising:
  aligning a first structural member having a structural coupler attached to an end of the first structural member with a second structural member having a structural coupler attached to an end of the second structural member;
  mating a face member of the structural coupler of the first structural member with a face member of the structural coupler of the second structural member; and
  coupling the structural coupler of the first structural member with the structural coupler of the second structural member using a coupling mechanism.

15. The method according to claim 14, further comprising:
  installing the first structural coupler to the end of the first structural member, comprising:
    inserting the first structural coupler into an inner channel of the first structural member; and
    attaching the first structural coupler to the first structural member; and
  installing the second structural coupler to the end of the second structural member, comprising:
    inserting the second structural coupler into an inner channel of the second structural member; and
    attaching the second structural coupler to the second structural member.

16. The method according to claim 15, wherein the first structural coupler and the second structural coupler are installed to the end of the first structural member and the second structural member at half-depth.

17. The method according to claim 14, further comprising:
  installing a beauty cap over a cut-out portion of the first and second structural members.

* * * * *